United States Patent
Skare et al.

(10) Patent No.: US 8,402,375 B1
(45) Date of Patent: Mar. 19, 2013

(54) SYSTEM AND METHOD FOR MANAGING BOOKMARK BUTTONS ON A BROWSER TOOLBAR

(75) Inventors: Travis Michael Skare, Mountain View, CA (US); Brandon Bilinski, San Francisco, CA (US)

(73) Assignee: Google Inc., Mountain View, CA (US)

( * ) Notice: Subject to any disclaimer, the term of this patent is extended or adjusted under 35 U.S.C. 154(b) by 5 days.

(21) Appl. No.: 13/245,758

(22) Filed: Sep. 26, 2011

Related U.S. Application Data (63) Continuation of application No. 13/236,607, filed on Sep. 19, 2011.

(51) Int. Cl.
*G06F 3/00* (2006.01)

(52) U.S. Cl. ........ 715/738; 714/744; 714/745; 714/747; 714/754; 714/763; 714/765; 714/781; 714/854

(58) Field of Classification Search .................. 715/738, 715/854, 744, 745, 747, 754, 763, 765, 781
See application file for complete search history.

(56) References Cited

U.S. PATENT DOCUMENTS

| | | | | |
|---|---|---|---|---|
| 5,448,691 A * | 9/1995 | Motoyama | ..................... | 715/205 |
| 6,003,046 A * | 12/1999 | Nielsen | ........................ | 715/206 |
| 6,141,010 A * | 10/2000 | Hoyle | ........................ | 715/854 |
| 6,321,228 B1 * | 11/2001 | Crandall et al. | ..................... | 1/1 |
| 6,546,393 B1 * | 4/2003 | Khan | ................................ | 1/1 |
| 6,628,314 B1 * | 9/2003 | Hoyle | ........................ | 715/854 |
| 6,691,106 B1 * | 2/2004 | Sathyanarayan | ..................... | 1/1 |
| 6,718,365 B1 * | 4/2004 | Dutta | ........................ | 709/203 |
| 6,771,290 B1 * | 8/2004 | Hoyle | ........................ | 715/745 |
| 7,028,261 B2 * | 4/2006 | Smyth et al. | ................... | 715/744 |
| 7,366,996 B2 * | 4/2008 | Hoyle | ........................ | 715/854 |
| 7,685,537 B2 * | 3/2010 | Hoyle | ........................ | 715/854 |
| 7,899,829 B1 * | 3/2011 | Malla | ........................ | 707/741 |
| 2002/0078089 A1 * | 6/2002 | Bade et al. | .................... | 707/513 |
| 2003/0063129 A1 * | 4/2003 | Smyth et al. | ................... | 345/810 |
| 2003/0065706 A1 * | 4/2003 | Smyth et al. | ................... | 709/200 |
| 2005/0005242 A1 * | 1/2005 | Hoyle | ........................ | 715/745 |
| 2006/0064411 A1 * | 3/2006 | Gross et al. | ....................... | 707/3 |
| 2006/0277488 A1 * | 12/2006 | Cok et al. | ........................ | 715/784 |
| 2008/0010142 A1 * | 1/2008 | O'Brien et al. | .................. | 705/14 |
| 2008/0115047 A1 * | 5/2008 | Petri | ........................ | 715/205 |

(Continued)

FOREIGN PATENT DOCUMENTS

AU 2010101239 A4 * 11/2010
WO WO 2007039477 A2 * 4/2007

OTHER PUBLICATIONS

Ask search q=bookmark+button&qsrc=0&o=0&l=dir.*

(Continued)

*Primary Examiner* — Boris Pesin
*Assistant Examiner* — John Heffington
(74) *Attorney, Agent, or Firm* — McDermott Will & Emery LLP (57) ABSTRACT

A system and method is disclosed for managing bookmark buttons on a web browser toolbar. A web browser stores the number of times it is used to navigate to a website. On navigating to a website a predetermined number of times, a bookmark button that links to the website is automatically generated and displayed on the toolbar. The number of bookmark buttons displayed at any one time is limited, and they are arranged by the number of times their associated websites have been viewed. On determining that a new website has been viewed more than a website associated with a currently displayed bookmark button, the currently displayed bookmark button is replaced by a new bookmark button that links to the new website.

27 Claims, 6 Drawing Sheets

U.S. PATENT DOCUMENTS

| | | | | |
|---|---|---|---|---|
| 2008/0288874 | A1* | 11/2008 | Hoyle | 715/738 |
| 2009/0038006 | A1* | 2/2009 | Traenkenschuh et al. | 726/21 |
| 2009/0044150 | A1* | 2/2009 | Liu et al. | 715/854 |
| 2009/0171967 | A1* | 7/2009 | Ceglowski | 707/10 |
| 2009/0265460 | A1* | 10/2009 | Balasubramanian et al. | 709/224 |
| 2010/0114705 | A1* | 5/2010 | Hoyle | 705/14.54 |
| 2010/0174606 | A1* | 7/2010 | Hoyle | 705/14.52 |
| 2011/0061010 | A1* | 3/2011 | Wasko | 715/769 |
| 2011/0161852 | A1* | 6/2011 | Vainio et al. | 715/769 |
| 2011/0208582 | A1* | 8/2011 | Hoyle | 705/14.49 |
| 2011/0291851 | A1* | 12/2011 | Whisenant | 340/686.1 |
| 2011/0307738 | A1* | 12/2011 | Hilerio et al. | 714/18 |
| 2011/0307794 | A1* | 12/2011 | Hilerio et al. | 715/738 |
| 2011/0307810 | A1* | 12/2011 | Hilerio et al. | 715/760 |
| 2011/0307811 | A1* | 12/2011 | Kim et al. | 715/760 |
| 2011/0307812 | A1* | 12/2011 | Hilerio et al. | 715/760 |
| 2011/0307880 | A1* | 12/2011 | Hilerio et al. | 717/171 |
| 2011/0307883 | A1* | 12/2011 | Hilerio et al. | 717/176 |
| 2011/0307946 | A1* | 12/2011 | Hilerio et al. | 726/7 |

OTHER PUBLICATIONS

Ask search qsrc=1 &o=0&l=dir&q=bookmark+button+toolb.*

* cited by examiner

FIG. 6

SYSTEM AND METHOD FOR MANAGING BOOKMARK BUTTONS ON A BROWSER TOOLBAR

CROSS-REFERENCE TO RELATED APPLICATIONS

This application is a continuation of U.S. patent application Ser. No. 13/236,607 entitled "System and Method for Managing Bookmark Buttons on a Browser Toolbar," filed on Sep. 19, 2011, the disclosure of which is hereby incorporated by reference in its entirety for all purposes.

TECHNICAL FIELD

The subject technology relates generally to computer-enabled Internet-accessible devices, namely web browser toolbars.

BACKGROUND

Internet users often revisit certain websites that have not been marked as a "favorite" or placed in the browsers list of bookmarks. While having the ability to save bookmarks to a browser's toolbar may create a convenient way to revisit favorite websites, many users tend to vary bookmarks on the toolbar according to need, as limited space is available. Continuously updating a toolbar to manage bookmarks that are no longer used, however, may become a time consuming process, and toolbars often become cluttered.

SUMMARY

The subject technology provides a system and method for managing bookmark buttons on a toolbar. According to one aspect, the method includes storing an address and a visit count for each web page visited by a web browser. For each web page, the method further includes incrementing the respective visit count on each visit to the web page, and displaying a bookmark button is displayed on the toolbar for each web page having a visit count greater than a threshold value, wherein each bookmark button is operable to initiate a request by the web browser for the associated web page using the stored address for the associated web page. Each visit count may include a number of visits to a corresponding web page made over a predetermined period of time. In other aspects, the method may include removing from the toolbar a displayed bookmark button for a website having a visit count lower than websites for other displayed bookmark buttons when a number of bookmarks reaches a predefined number.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
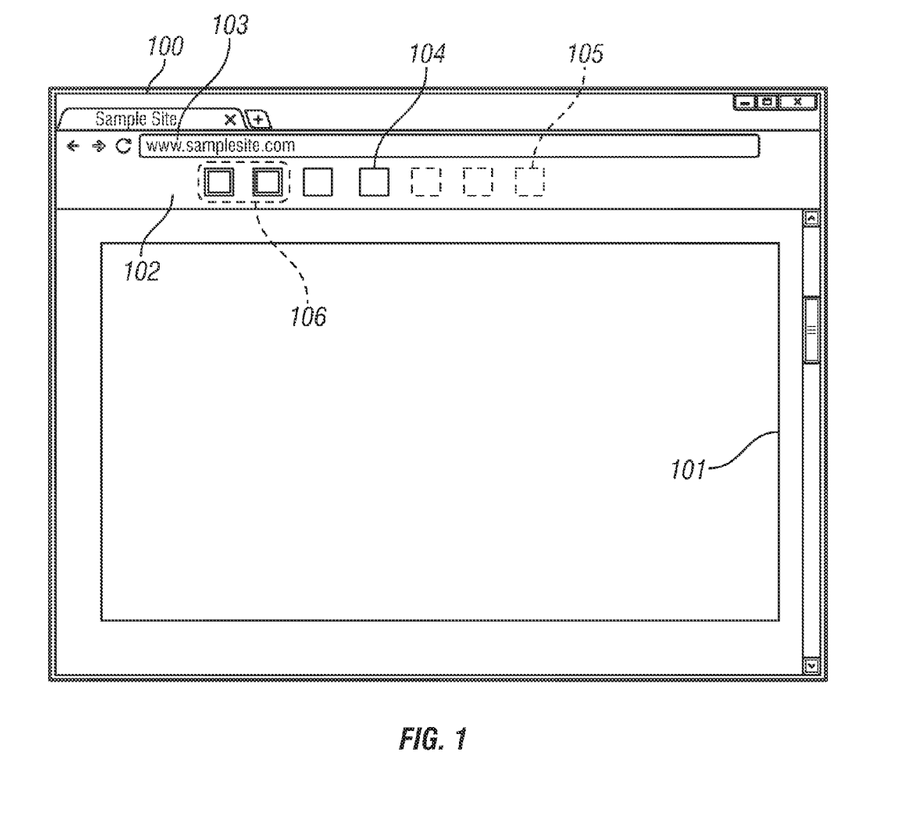
FIG. 1 is a first exemplary diagram of a web browser, including a toolbar for managing bookmark buttons according to one aspect of the subject technology.

FIG. 1 is a first exemplary diagram of a web browser, including a toolbar for managing bookmark buttons according to one aspect of the subject technology. The subject technology provides a computer-enabled device (for example, device 501 of FIG. 5) for display and use of a web browser 100. Web browser 100 includes a content area 101 for displaying websites displayed by browser 101, one or more toolbars 102, and a address bar 103 for user-generated input of a web address. On input of a web address to address bar 103, browser 100 will navigate to a corresponding website for display in content area 101. In one aspect, as a user navigates the Internet, a history of websites is stored along with the number of times each website has been visited. A history file may be maintained (for example, by software associated with toolbar 102) on a local computer responsible for executing the browser, or a remote server (for example, a data cloud) operably connected to the browser via a network connection (for example, over the Internet, WAN, LAN, or the like). The history file may include a visit count for each visited website and/or web address. The visit count may be incremented on a visit to a corresponding website and/or web address. After a website has been visited a number of times, a bookmark button 104 corresponding to the website may be generated and positioned on toolbar 102 of browser 100. Bookmark button 104 may be configured to provide an address of the website to browser 100 for initiation of a request by the web browser to receive and display the website.

The determination of the visit counts and generation and display of button 104 may be at the startup of web browser 100, or, in some cases, each time the visit count is updated. In one aspect, a bookmark button 104 may be generated after its respective website has been visited a number of times equal to or greater to a visit threshold value. For example, a bookmark button 104 may be generated after 10 visits. In another aspect, bookmark button 104 may be generated if the associated website was visited a predetermined number of times within a predetermine period of time. For example, the visit count may only keep track of visits to the website over the past day, several days, week, or the like. Visits that predate the period may not be counted, or may be reset. In this regard, a bookmark button 104 may not be generated, or removed from toolbar 102, for websites that may have once been highly viewed in a short period of time, but since have not been visited in a long time, or may never be visited again. In other aspects, the visit count may be incremented starting from a certain date and then reset (for example, to zero) after a predetermined period of time has expired.

Each time a website is visited via a URL being typed or placed into address bar 103 of web browser 100, the visit count for the corresponding bookmark button may be incremented by 1 visit, however, in some aspects, the number of visits may be incremented by other values. In one aspect, the visit count may be incremented by a significantly smaller amount when using a bookmark or bookmark button 104 to navigate to a website. For example, if a bookmark button 104 is used to access the website the visit count may only be incremented by 0.5 visits. To this end, the number of times a website is visited and/or displayed in response to a navigation request initiated from an associated button 104 may be given less weight than a number of times a website is visited and/or displayed in response to a navigation request made by other means (for example, by typing a web address in address bar 103). In some aspects, a visit count may not be incremented until a URL has been fixed in the address bar for a predetermined time (for example, three seconds).

Bookmark buttons 104 may also be positioned on toolbar 102 in a manner associated with the visit count. For example, one or more buttons 104 displayed on toolbar 102 may be arranged according to a number of times each associated website was displayed in content area 101 of browser 100. In one aspect, buttons 104 may be arranged on toolbar 102 in order of decreasing visits, from left to right. As the visit count corresponding to the website of a newer bookmark button overtakes the visit count of websites having bookmark buttons already on the toolbar, the newer button may be moved toward the left. In this regard, a bookmark button associated with the highest visit count may be positioned the farthest to the left. In another aspect, a browser may be configured to allow a maximum number of bookmark buttons (for example, seven). In this regard there may be one or more currently displayed buttons 104 and one or more empty (for example, non-visible) button spaces 105. A new bookmark button 104 may fill a space 105 when its associated website's visit count rises above the visit threshold.

A currently displayed bookmark button associated with a website having the lowest number of visits may be removed from the toolbar and replaced with a new bookmark button when the number of currently displayed bookmark buttons 104 has reached the maximum (see, for example, FIG. 2), and the website corresponding to the new bookmark button is determined to have been displayed by the browser a greater number of times than the website corresponding to the currently displayed button.

Toolbar 102 may also include one or more default buttons 106 (depicted in FIG. 1 as having a double solid line). Websites associated with default buttons 106 may have an initial associated visit count set so that they are not immediately removed by new buttons (for example, set to 10). If there are less than the maximum limit of default buttons, new buttons 104 may be added to toolbar 102 as the visit counts of their corresponding websites move over the visit threshold. The default buttons may then be moved to the right, and ultimately removed, as user-generated automated bookmarks exceed the visit count of the default buttons.

Figure 2:
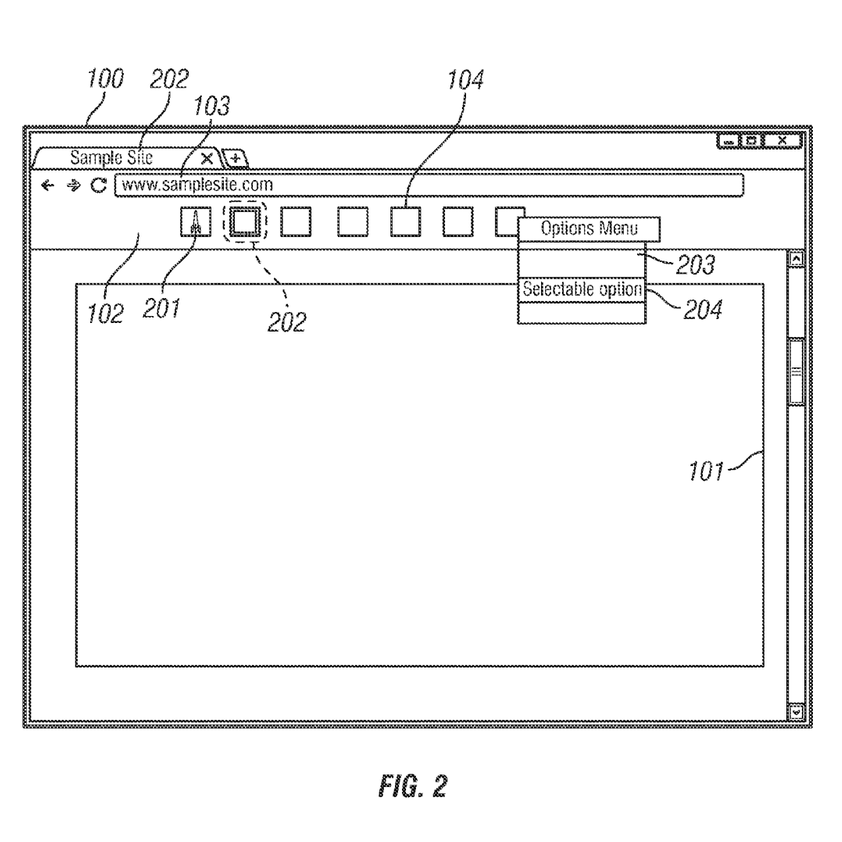
FIG. 2 is a second exemplary diagram of a web browser, including a toolbar for managing bookmark buttons according to one aspect of the subject technology.

FIG. 2 is a second exemplary diagram of a web browser, including a toolbar for managing bookmark buttons according to one aspect of the subject technology. In one aspect, one or more bookmark buttons 104 may include a graphic icon 201. Graphic icon 201 may be generated from an icon displayed in a title bar 202 of the browser (for example, a favicon) when navigating to a website associated with the icon. Alternatively, or if no such icon is available, icon 201 may be selected from one or more predefined icons, for example, stored on the computer-enabled device (for example, device 501 of FIG. 5) or on a device storage (for example, database 504 or 507 of FIG. 5) when toolbar 102 is installed. In this regard, an icon 201 may be selected to distinguish each bookmark button from each other. In further aspects, a bookmark button 104 may include a menu 203 that may be displayed by interacting with the associated bookmark button. For example, menu 203 may be generated, and selectable menu options 204 displayed, by hovering over the bookmark button, selecting the button, or, in some aspects, visually depressing the button but not executing a release before the menu options are displayed.

The menu may further include one or more options to remove or lock or "pin" the associated bookmark button. A locked, or "pinned", bookmark button 202 (depicted in FIG. 2 as having a hatched border) may not be overtaken by a newer button even if its corresponding website was displayed by browser 100 a greater number of times than the website associated with the locked button. In other aspects, if a bookmarked website includes a web feed (for example, ATOM, RSS, or the like) a menu 203 may include, as one or more menu items, one or more respective postings from the RSS feed, and/or including associated graphic content.

Figure 3:
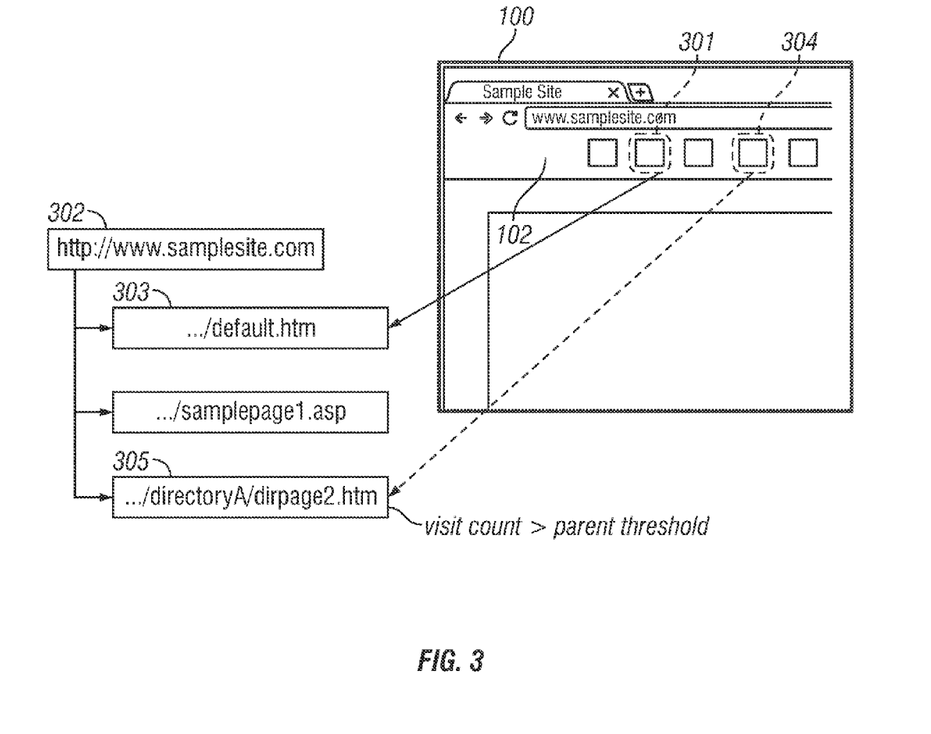
FIG. 3 is an exemplary diagram of associating a bookmark button with a parent web page according to one aspect of the subject technology.

FIG. 3 is an exemplary diagram of associating a bookmark button with a parent web page according to one aspect of the subject technology. In this aspect, a combined visit count may be stored for a plurality of web pages displayed by web browser 100. The combined visit count may be incremented on a visit to one of the plurality of web pages, and a parent button 301 displayed on toolbar 102. The parent button may be operable to initiate a request by the web browser for a parent website 302 associated with the plurality of web pages using a parent URL address. For example, if the stored history shows that a user has visited multiple web pages under a single parent 302, a root webpage (for example, default.htm), domain or sub-domain, or directory, a bookmark button may only include a link to parent 302. In one aspect, a parent button 301 may be linked to a default page 303 of a parent 301 (for example, index.htm, default.asp, default.htm, or the like). Accordingly, parent button 301 may include a parent URL for one or more visited websites.

A collective visit count of the visited websites, web pages, and/or domain, may be used to determine whether parent button 301 is displayed for multiple websites and/or pages. The system may determine, for example, that two or more web pages of a parent website 302 were displayed by the browser as a result of separate navigation requests not made from within the parent website. Parent button 301 may then be displayed on toolbar 102 to initiate a request for the associated parent page (302 or 303). The user may then navigate to the web pages responsible for generating the parent button by navigating through parent website 302. In another example, a stored address may be representative of the parent (302 or 303) if all pages were visited equally, or a number of times within a certain delta of each other, and the parent was visited one or more times. In some aspects, a parent threshold value may be included for the parent that may be used to determine whether a web page under the parent is worthy of its own bookmark button. A bookmark button 304 may be generated and displayed on the toolbar for a page 305 under a parent when its visit count meets or exceeds the parent threshold value.

Figure 4:
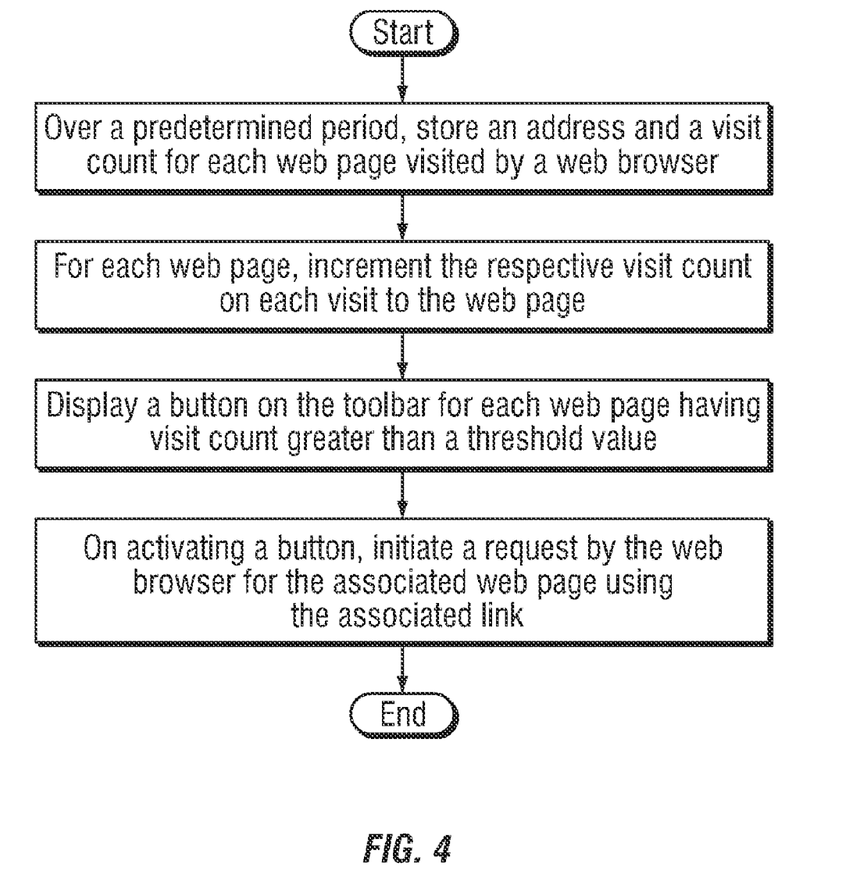
FIG. 4 is a flowchart illustrating an exemplary process for managing bookmark buttons on a toolbar according to one aspect of the subject technology.

FIG. 4 is a flowchart illustrating an exemplary process for managing bookmark buttons on a toolbar according to one aspect of the subject technology. In a first process 401, a computer-enabled device, over a predetermined period, stores an address (for example, in the form of a hyperlink) and a visit count for each web page displayed by a web browser. In a second process 402, the visit count of each web page is incremented when it is navigated to and/or displayed in the browser. First process 401 and second process 402 may be ongoing during a browser session, or over multiple sessions, and the visit count may be stored locally on the device hosting the browser, or remotely on a server. In a third process 403, a button is displayed on the toolbar for each web page having a visit count greater than a threshold value. The button may function similar to a bookmark. On activating a button, the browser, in a fourth process 404, initiates a request for the associated web page using the stored address for the associated web page.

As described previously, the system may be configured to limit the number of bookmark buttons displayed on toolbar 102 to a maximum limit. If, during the third process 403, the addition of a new button would cause the number of currently displayed buttons to be over the maximum limit, and the visit count for the web page corresponding to the new button is greater than the visit counts of the web pages represented by the other currently displayed buttons, then a currently displayed button corresponding to the web page with the lowest number of visit counts may be removed and replaced with the new button. The number of visit counts and number and position of corresponding buttons may be determined, and the corresponding buttons displayed, at the startup of the web browser, or, in some cases, each time a visit count is updated.

Figure 5:
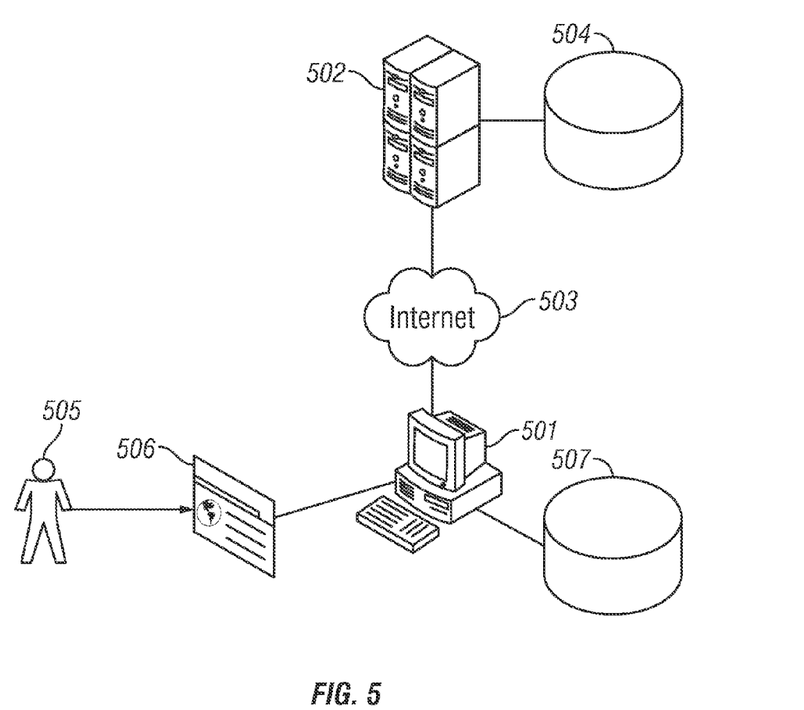
FIG. 5 is an exemplary diagram illustrating server and database components of a system for managing bookmark buttons on a toolbar according to one aspect of the subject technology.

FIG. 5 is an exemplary diagram illustrating server and database components of a system for managing bookmark buttons on a toolbar according to one aspect of the subject technology. A system compatible with the subject technology includes a computer-enabled device 501 (for example a personal computer, PDA, Smartphone or the like) connected to one or more servers 502 via a network connection 503 (for example, the Internet, LAN/WAN, or the like). One or more servers 502 may be connected to one or more databases 504 (for example, on a database server) for storing web-related content. A user 505 may use device 501 to connect to the one or more servers 502 to view the web-related content. User 505 may interact with a user interface 506 (for example, browser 100) provided by device 501, and having controls (for example, drop down lists, selection choices, text inputs or the like) for navigating to and for displaying one or more websites, website domains, and/or file systems. In one aspect, the one or more servers 502 are operable to receive and respond to user-generated navigation requests from user interface 506, to serve one or more websites to be displayed at user interface 506. The one or more servers 502 may also be operable to transmit user-specific data (for example, web history and/or visit count) for storage on database 504.

Web history, including web addresses and visit counts, may be stored and/or updated in a local memory storage 507 on device 100. Storage 507 may include a persistent memory storage, for example, a SQL database located on device 100. In another example, the storage may include formatted strings (for example, JSON) in one or more text files. In a further example, history and visit information may be stored on a data cloud, remote from device 100 (for example, a centralized database 504). In some aspects, device 501 and/or server 502 may refresh the visit count of one or more stored addresses after a predetermined time period (for example, one month), or discard visit data prior to a predetermined period (for example, purge all visit information prior to the last 30 days). In this regard, a bookmark button 104 may be removed from toolbar 102 if there has been no visits to its corresponding web address for a predetermined time. Accordingly, bookmarks buttons 104 may be automatically managed, not only on a number of visits to their associated websites, but also based on the frequency of those visits.

Figure 6:
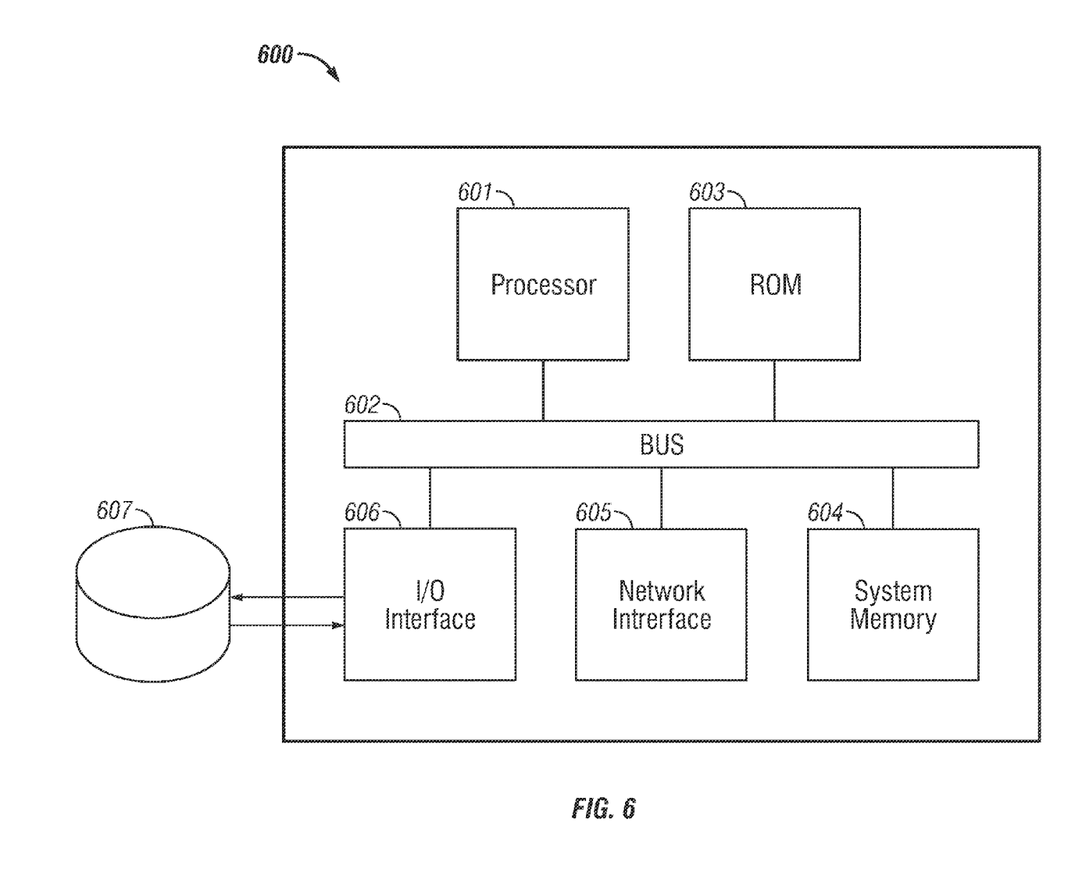
FIG. 6 is a diagram illustrating an exemplary server system for managing bookmark buttons on a toolbar, including a processor and other internal components, according to one aspect of the subject technology.

FIG. 6 is a diagram illustrating an exemplary server system for managing bookmark buttons on a toolbar, including a processor and other internal components, according to one aspect of the subject technology. In some aspects, a computerized device 600 (for example, computer-enabled device 501 or the like) includes several internal components such as a processor 601, a system bus 602, read-only memory 603, system memory 604, network interface 605, I/O interface 606, and the like. In one aspect, processor 601 may also be communication with a storage medium 607 (for example, a hard drive, database, or data cloud) via I/O interface 606. In some aspects, all of these elements of device 600 may be integrated into a single device. In other aspects, these elements may be configured as separate components.

Processor 601 may be configured to execute code or instructions to perform the operations and functionality described herein, manage request flow and address mappings, and to perform calculations and generate commands. Processor 601 is configured to monitor and control the operation of the components in server 600. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 601. Likewise, one or more sequences of instructions may be software stored and read from system memory 605, ROM 603, or received from a storage medium 607 (for example, via I/O interface 606). ROM 603, system memory 605, and storage medium 607 represent examples of machine or computer readable media on which instructions/code may be executable by processor 601. Machine or computer readable media may generally refer to any medium or media used to provide instructions to processor 601, including both volatile media, such as dynamic memory used for system memory 604 or for buffers within processor 601, and non-volatile media, such as electronic media, optical media, and magnetic media.

In some aspects, processor 601 is configured to communicate with one or more external devices (for example, via I/O interface 606). Processor 601 is further configured to read data stored in system memory 604 and/or storage medium 607 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 604 represents volatile memory used to temporarily store data and information used to manage device 600. According to one aspect of the subject technology, system memory 604 is random access memory (RAM) such as double data rate (DDR) RAM. Other types of RAM also may be used to implement system memory 604. Memory 604 may be implemented using a single RAM module or multiple RAM modules. While system memory 604 is depicted as being part of device 600, those skilled in the art will recognize that system memory 604 may be separate from device 600 without departing from the scope of the subject technology. Alternatively, system memory 604 may be a non-volatile memory such as a magnetic disk, flash memory, peripheral SSD, and the like.

I/O interface 606 may be configured to be coupled to one or more external devices, to receive data from the one or more external devices and to send data to the one or more external devices. I/O interface 606 may include both electrical and physical connections for operably coupling I/O interface 606 to processor 601, for example, via the bus 602. I/O interface 606 is configured to communicate data, addresses, and control signals between the internal components attached to bus 602 (for example, processor 601) and one or more external devices (for example, a hard drive). I/O interface 606 may be configured to implement a standard interface, such as Serial-Attached SCSI (SAS), Fiber Channel interface, PCI Express (PCIe), SATA, USB, and the like. I/O interface 606 may be configured to implement only one interface. Alternatively, I/O interface 606 may be configured to implement multiple interfaces, which are individually selectable using a configuration parameter selected by a user or programmed at the time of assembly. I/O interface 606 may include one or more buffers for buffering transmissions between one or more external devices and bus 602 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for managing bookmark buttons on a toolbar based on web page visit frequency, comprising:

storing an address and a visit count for each web page visited by a web browser;

for each address, incrementing the respective visit count on each visit to the web page;

creating for display a bookmark button on the toolbar for each web page having a visit count greater than a threshold value, each bookmark button operable to initiate a request by the web browser for the associated web page using the stored address for the associated web page; and determining that at least two web pages of a parent website were displayed by the web browser as a result of separate navigation requests not made from within the parent website, wherein a button corresponding to the parent website is displayed on the toolbar and operable to initiate a request by the web browser for a parent web page.

2. The computer-implemented method of claim 1, wherein the visit count is incremented for a corresponding web page over a predetermined period of time.

3. The computer-implemented method of claim 2, wherein the visit count is reset after the predetermined period of time has expired.

4. The computer-implemented method of claim 1, further comprising:
   providing instructions to remove from the toolbar a displayed bookmark button for a website having a visit count lower than websites for other displayed bookmark buttons when a number of bookmarks reaches a predefined number.

5. The computer-implemented method of claim 4, wherein each displayed bookmark button is moved in position to the left as it overtakes an adjacent button in visit count.

6. The computer-implemented method of claim 4, further comprising:
   locking a selected bookmark button such that the selected bookmark button may not be overtaken by a newer bookmark button with a greater visit count.

7. The computer-implemented method of claim 1, replacing a currently displayed bookmark button with a new button when an address associated with the currently displayed bookmark button has not been navigated by the browser for a predetermined period of time.

8. The computer-implemented method of claim 1, wherein the respective visit count is incremented by a significantly smaller amount when using a bookmark or bookmark button to visit the web page, than an amount incremented when visiting the web page by other means.

9. The computer-implemented method of claim 1, wherein the bookmark buttons are displayed on a startup of the web browser based on their corresponding visit counts.

10. The computer-implemented method of claim 1, further comprising:
    on determining a favicon of a website corresponding to a displayed bookmark button, including the favicon as part of the displayed bookmark button, otherwise including a graphic icon selected from one or more predefined icons as part of the displayed bookmark button.

11. The computer-implemented method of claim 10, wherein the graphic icon is selected to be different than icons of other displayed bookmark buttons.

12. The computer-implemented method of claim 1, further comprising:
    storing a combined visit count for the at least two web pages displayed by the web browser; and
    incrementing the combined visit count on a visit to one of the at least two web pages.

13. The computer-implemented method of claim 12, wherein the at least two web pages are associated with each other and the parent website is in a parent-child relationship with at least one of the at least two web pages.

14. The computer-implemented method of claim 12, further comprising:
    displaying a bookmark button on the toolbar for one of the at least two web pages having an individual visit count greater than a parent threshold value.

15. A non-transitory machine-readable medium having machine-executable instructions stored thereon, which when executed by a machine or computer cause the machine or computer to perform a method of managing bookmark buttons on a toolbar based on web page visit frequency, the method comprising:
    on determining a number of times one or more websites was displayed by a browser meets or exceeds a predetermined threshold, automatically displaying, on a startup of the browser, one or more corresponding buttons on a toolbar of the browser, each corresponding button representative of a hyperlink to a respective one of the one or more websites; and
    determining that at least two web pages of a parent website were displayed by the browser as a result of separate navigation requests not made from within the parent website, wherein a button corresponding to the parent website is displayed on the browser toolbar and operable to initiate a request by the browser for a parent web page.

16. The non-transitory machine-readable medium of claim 15, the method further comprising:
    storing the number of times as a visit count for each of the one or more web sites displayed by the browser; and
    incrementing a respective visit count on a visit to a corresponding website.

17. The non-transitory machine-readable medium of claim 16, wherein the visit count is incremented for a corresponding web page over a predetermined period of time.

18. The non-transitory machine-readable medium of claim 17, wherein the visit count is reset after the predetermined period of time has expired.

19. The non-transitory machine-readable medium of claim 16, wherein storing a visit count for each of the one or more websites includes associating the visit count with a single web address of each of the web sites.

20. The non-transitory machine-readable medium of claim 15, the method further comprising:
    on determining a number of times one or more of the at least two web pages was displayed by the browser meets or exceeds a parent threshold value, automatically displaying on the toolbar one or more respective buttons.

21. The non-transitory machine-readable medium of claim 15, the method further comprising:
    removing a currently displayed button from the toolbar and replacing it with a new button on determining a number of currently displayed buttons is at a maximum limit, and a website corresponding to the new button was displayed by the browser a greater number of times than a website corresponding to the currently displayed button.

22. The non-transitory machine-readable medium of claim 21, wherein each of the one or more corresponding buttons displayed on the toolbar are arranged according to a number of times each corresponding website was displayed by the browser, in decreasing order from left to right.

23. The non-transitory machine-readable medium of claim 21, the method further comprising:
    locking a selected button such that the selected button may not be overtaken by a newer button corresponding to a website that was displayed by the browser a greater number of times than the selected button.

24. The non-transitory machine-readable medium of claim 15, wherein a number of times a website is displayed in response to a navigation request initiated from an associated button is given less weight than a number of times a website is displayed in response to a navigation request not made from a button.

25. The non-transitory machine-readable medium of claim 15, the method further comprising:
    on determining a favicon of a website corresponding to a displayed button, including the favicon as part of the displayed button, otherwise including a graphic icon selected from one or more predefined icons as part of the displayed button, wherein the graphic icon is selected to be different than icons of other displayed bookmark buttons.

26. A system, comprising:

a processor; and a memory including software for generating a web browser that, when executed by the processor, causes the processor to:

display a web browser including a toolbar;

for each web address navigated by the web browser, store a number of times the web address was navigated over a predetermined period of time;

on navigating to a web address a predetermined number of times, generate and display on the toolbar a bookmark button operable to generate a navigation request to a respective website associated with the web address; and determine that at least two web pages of a parent website were displayed by the web browser as a result of separate navigation requests not made from within the parent website, wherein a button corresponding to the parent website is displayed on the toolbar and operable to initiate a request by the web browser for a parent web page.

27. The system of claim 26, wherein the software, when executed, further causes the processor to:

remove a currently displayed bookmark button from the toolbar and replace it with a new bookmark button when a number of currently displayed bookmark buttons is at a maximum limit, and a web address corresponding to the new bookmark button was navigated by the browser a greater number of times than a web address corresponding to the currently displayed button.

* * * * *